S. W. TRAYLOR.
DRILLING, REAMING, AND CENTERING MACHINE.
APPLICATION FILED NOV. 27, 1915.
1,221,247.
Patented Apr. 3, 1917.
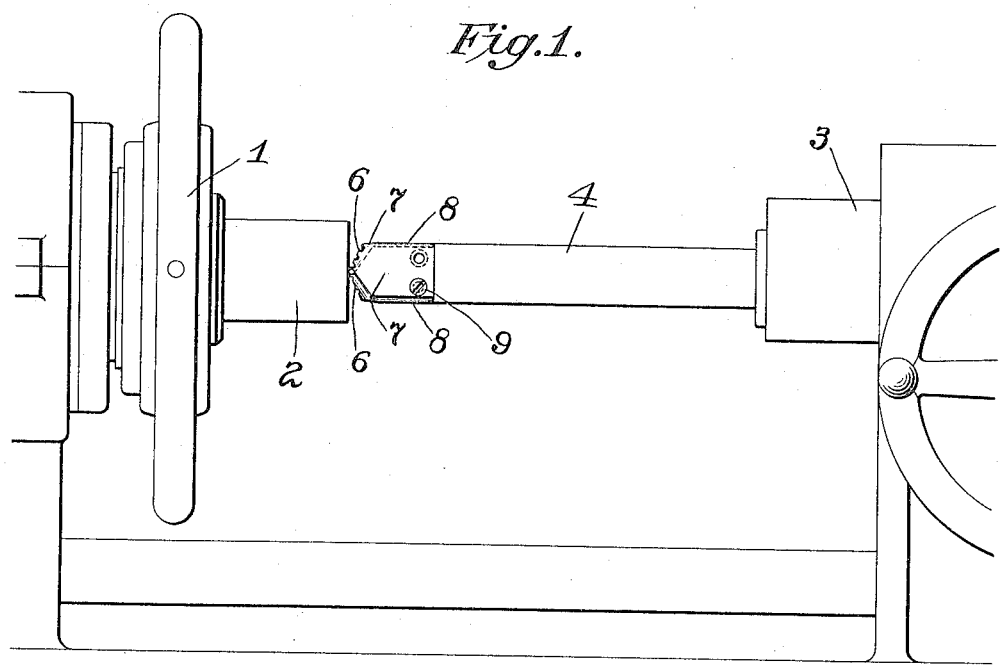
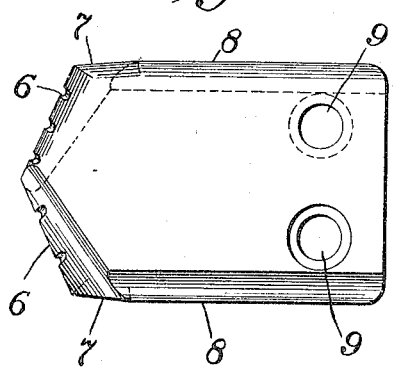
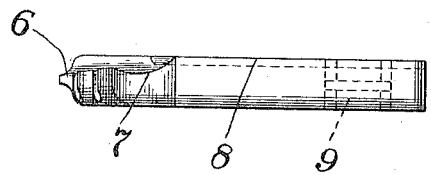
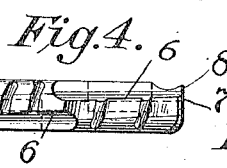
Inventor:
Samuel W. Traylor,
by Spear, Middleton, Donaldson & Spear
Atty's.

UNITED STATES PATENT OFFICE.

SAMUEL W. TRAYLOR, OF ALLENTOWN, PENNSYLVANIA.

DRILLING, REAMING, AND CENTERING MACHINE.

1,221,247. Specification of Letters Patent. Patented Apr. 3, 1917.

Application filed November 27, 1915. Serial No. 63,839.

*To all whom it may concern:*

Be it known that I, SAMUEL W. TRAYLOR, citizen of the United States, residing at Allentown, Pennsylvania, have invented certain new and useful Improvements in Drilling, Reaming, and Centering Machines, of which the following is a specification.

My invention relates to drilling, reaming and centering machines, and concerns particularly the construction of a tool for use in such machines whereby the operation of drilling, rough reaming, and finishing reaming may be performed at one continuous operation.

In making certain classes of articles like war munitions, in which shells are bored from a solid bar, it has been the practice to first drill an opening in the piece out of which the shell is to be made, this drilling operation being performed in one machine, after which the piece is taken to a lathe and the opening formed by the twist drill is rough reamed to a larger size. The piece is then placed in another lathe and subjected to the action of a finishing reamer. By the use of my invention these various operations are performed in the same machine and by the same tool.

The invention is illustrated in the accompanying drawings, in which—

Figure 1 represents a chuck and a portion of the boring head of a horizontal drill press or reamer, the tool being shown in place;

Fig. 2 is a side view of the tool detached;

Fig. 3 is an edge view of the tool;

Fig. 4 shows in elevation the front edge of the tool.

In these drawings, the chuck is shown at 1, this being of ordinary form adapted to hold the work piece indicated at 2 from which the shell is to be made. 3 indicates a portion of the boring head carrying the boring bar 4 to the end of which is attached the combined boring and reaming tool constituting the main feature of my invention. The chuck is rotated to rotate the work piece and the boring bar is advanced to act on the work piece in any ordinary manner. As before stated, under present practice the work piece would be subjected to the action of a twist drill, which would form an opening therein say one and five-eighth inches in diameter, the work piece would then be put in a lathe, and a reamer run into the one and five-eighth inch opening, and this would ream out the opening to a size of, say, one and thirteen-sixteenth inches, after which the work piece would be removed and placed in another lathe, where a finishing reamer consisting of a flat bit is run into the shell at extra low speed, say, about thirty revolutions a minute, requiring about six minutes to finish the shell through a distance of eight and three-fourth inches. My improved bit or tool consists of a broad, flat member having its end formed on two inclines meeting at the longitudinal axis of the member, thus providing cutting or drilling edges at 6. In rear of these cutting or drilling edges the tool is provided with inclined side edges at 7, these diverging slightly from each other toward the rear of the tool, and merging into the parallel edges 8, these latter edges extending to the rear of the tool. The slightly inclined side edges 7 are for reaming out the opening formed by the drilling or cutting edges 6 at the end of the tool, and the parallel edges 8 serve to finish the reaming out of the opening formed by the reaming edges 7, these latter edges performing a rough reaming operation which is immediately followed by the finishing reaming operation performed by the parallel edges. This tool may be secured to the boring bar in any suitable way, such as by bolts passing through the openings 9. With my improvement the entire work of drilling rough reaming and finishing reaming is done by the tool described, and the entire operation can be performed in five minutes. A smooth interior wall is formed by this tool while the shell may be rotated at a speed of two hundred revolutions per minute. The improvement not only saves a large amount of time, but dispenses with a number of different tools, and the consequent attention in handling them.

I claim as my invention:—

1. The combined drilling and reaming tool consisting of a flat piece having a V-shaped end providing converging inclined drilling or cutting edges, said piece in rear of said drilling or cutting edges having inclined side edges diverging from each other, said inclined side edges merging at a low angle into parallel edges, the said low angle diverging inclined edges and the parallel edges serving as reaming means, substantially as described.

2. A combined drilling and reaming tool having inclined cutting edges meeting at a point at the longitudinal axial line of the tool, parallel finishing reaming edges in rear of the inclined cutting edges and lying in planes slightly out beyond points of termination of the inclined cutting edges and rough reaming edges lying intermediate the parallel reaming edges and inclined cutting edges, said intermediate roughing edges being only slightly inclined in respect to the parallel reaming edges, substantially as described.

In testimony whereof, I affix my signature in presence of two witnesses.

SAMUEL W. TRAYLOR.

Witnesses:
ELLA M. SNYDER,
F. R. CUSPEN.